(12) United States Patent
Olivieri

(10) Patent No.: US 6,993,195 B2
(45) Date of Patent: Jan. 31, 2006

(54) CODING AND NOISE FILTERING AN IMAGE SEQUENCE

(75) Inventor: Stefano Olivieri, Teramo (IT)

(73) Assignee: Koninklijke Philips Electronics N.V., Eindhoven (NL)

( * ) Notice: Subject to any disclaimer, the term of this patent is extended or adjusted under 35 U.S.C. 154(b) by 82 days.

(21) Appl. No.: 10/282,451

(22) Filed: Oct. 29, 2002

(65) Prior Publication Data

US 2003/0053709 A1 Mar. 20, 2003

Related U.S. Application Data

(63) Continuation of application No. 09/477,219, filed on Jan. 4, 2000, now Pat. No. 6,856,699.

(30) Foreign Application Priority Data

Jan. 15, 1999 (EP) ................................. 99200193
Jun. 24, 1999 (EP) ................................. 99202038

(51) Int. Cl.
  *G06K 9/36* (2006.01)
(52) U.S. Cl. ..................................... 382/232; 382/239
(58) Field of Classification Search ................ 382/260, 382/261, 236, 164, 232, 237, 100, 239; 348/607, 348/700, 620; 375/240.03; 360/32, 65; 341/76, 200; 324/426; 708/551; 706/14, 706/21, 22, 24, 925, 929, 10, 16, 28; 702/144; 386/114, 124
See application file for complete search history.

(56) References Cited

U.S. PATENT DOCUMENTS

| 5,396,248 A | * | 3/1995 | Miyazaki et al. | ........... 341/200 |
|---|---|---|---|---|
| 5,402,520 A | * | 3/1995 | Schnitta | ....................... 706/16 |
| 5,490,094 A | * | 2/1996 | Heimburger et al. | ....... 348/607 |
| 5,534,917 A | * | 7/1996 | MacDougall | ................ 348/169 |
| 5,617,513 A | * | 4/1997 | Schnitta | ........................ 706/14 |
| 5,696,710 A | * | 12/1997 | Hague et al. | ................ 708/551 |
| 5,701,106 A | * | 12/1997 | Pikkarainen et al. | ........ 332/100 |
| 5,790,704 A | * | 8/1998 | Rao et al. | .................... 382/237 |
| 5,909,515 A | * | 6/1999 | Makram-Ebeid | ............ 382/260 |

(Continued)

FOREIGN PATENT DOCUMENTS

JP  62234495 A  *  10/1987

OTHER PUBLICATIONS

Suthaharan et al., "A New Post-Filtering Technique for Block-Based Transform Coded Images", IEEE, vol. 2, Nov. 1996, pps. 702-705.*

*Primary Examiner*—Anh Hong Do

(57) ABSTRACT

The invention provides a method of and a device for coding (10*) an image sequence (g(i,j,k)). The device (10*) has a noise filter (12) for noise filtering (12) the image sequence (g(i,j,k)), and for regarding the noise filtering (12) as a rate-distortion optimization problem in order to adapt the response of the noise filter (12). In particular, a filter parameter set (C) is determined to adapt the response of the filter (12) in that the image sequence (g(i,j,k)) is encoded using an optimal bit-budget, which is the bit-budget used for compressing a noise-free image sequence, and the distortion for the given bit-budget is minimized.

A solution of the rate-distortion problem is proposed that calculates (12) the filter parameter set (C) by a Lagrange multiplier method. Separate minimization is used to determine each parameter of the parameter set (C) independently. In a practical embodiment, a spatial adaptive weighted averaging (SAWA) filtering (23) is used to estimate the bit budget ($R^{f^*}$) and to pre-filter the image sequence (g(i,j,k)).

5 Claims, 2 Drawing Sheets

U.S. PATENT DOCUMENTS

| | | | |
|---|---|---|---|
| 6,026,190 A | * | 2/2000 | Astle .......................... 382/232 |
| 6,100,940 A | * | 8/2000 | Dieterich ................... 348/700 |
| 6,178,216 B1 | * | 1/2001 | Lee ............................ 375/376 |
| 6,535,632 B1 | * | 3/2003 | Park et al. .................. 382/164 |
| 6,549,014 B1 | * | 4/2003 | Kutkut et al. ............... 324/426 |

* cited by examiner

CODING AND NOISE FILTERING AN IMAGE SEQUENCE

CROSS REFERENCE TO RELATED APPLICATIONS

This is a continuation of application Ser. No. 09/477,219, filed Jan. 4, 2000 now U.S. Pat. No. 6,856,699.

The invention relates to a method of and a device for coding an image sequence, in which the image sequence is noise filtered.

Kleihorst et al. [1] describe a single-chip MPEG2 encoder that employs an adaptive noise filter. The structure of the noise filter 2 is shown in FIG. 1. Besides the noise filter 2, the prior art embodiment has a subtractor 1, an adder 3, a selector 4, a main loop memory 5 and a motion estimator 6. For simplicity reasons, the signals are represented as 1-dimensional data. Here g(k) is the observed, noisy, signal; $f_{MC}(k-1)$ is the previously filtered (and coded-decoded) signal which is retrieved from the main loop memory 5. Note that the subscript MC denotes that this signal is motion compensated to lie along the motion trajectory of g(k). The result of the filtering is $f(k)$, this is inserted into the coding chain instead of the noisy g(k). Within inter-coded macroblocks, the signal $f-f_{MC}(k-1)$ is forwarded. The Kalman-gain multiplier $0 \leq C \leq 1$ is controlled to adapt the filter 2 to the situation at hand. Setting C=1, forwards the (noisy) observation and no filtering action takes place. If C=0, then only the prediction is forwarded, while for intermediate values of C noise filtering is achieved. Except from globally controlling this value, C is also directly controlled by the result of the motion compensation. This is done to avoid blurring in situations where MPEG's (translational-) motion model is insufficient. Reversely, the adaptivity also increases filtering effort if a good motion-compensation is detected.

An object of the invention is, inter alia, to provide a more effective filtering. To this end, the invention provides a method of and a device for coding an image sequence and a camera system as defined in the independent claims. Advantageous embodiments are defined in the dependent claims.

A first embodiment of the invention is based on regarding the noise filtering as a rate-distortion optimization problem in order to adapt the noise filtering. The invention takes into account both the reduced quality of the encoded pictures and the increased amount of bits to transmit due to noise corruption. The invention allows adaptive filtering of image sequences resulting in better compression and distortion performance. Preferably, a filter parameter set is determined to adapt the response of the filter in that: the image sequence is encoded using an optimal bit-budget (or rate) R which is used for compressing a noise-free image sequence, and the distortion D for the given bit-budget R is minimized. The distortion of a certain frame due to the encoding process and the number of bits used to encode that frame need to be evaluated. The rate-distortion problem can be solved efficiently by calculating the filter parameter set by a Lagrange multiplier method.

A further embodiment according to the invention uses an effective algorithm to estimate an optimal Lagrange multiplier by determining a maximum of a second derivative of the bit budget R. In this embodiment the optimal Lagrange multiplier is determined without prior knowledge of the rate constraint and noise characteristics.

A practical embodiment according to the invention uses spatial adaptive weighted averaging filtering to estimate the rate. In a further embodiment the spatial adaptive weighted averaging filtering is used to pre-filter the image sequence. This is done to exploit the spatial correlation between the pixels and to reduce the processing burden compared to three-dimensional filtering techniques. The displacement vectors are now estimated from the current and the previous frame after they are spatially filtered, which provides additional robustness to the motion estimates.

The aforementioned and other aspects of the invention will be apparent from and elucidated with reference to the embodiments described hereinafter.

The drawings only show those elements that are necessary to understand the invention.

The invention regards noise filtering of an image sequence as a rate-distortion optimization problem in that the response of a filter can be adapted. In particular, an optimal filter parameter set is determined such that noisy images are encoded using an optimal bit budget and the distortion is minimized. The optimal bit budget is a number of bits that would be used for compressing a noise-free image sequence. As a favorable implementation, a solution based on a Lagrange multiplier method will be proposed. This method enables an efficient solution of the rate-distortion problem. Moreover, an effective algorithm will be discussed, which determines an optimal Lagrange multiplier without prior knowledge of the bit budget, i.e. a rate constraint, and noise characteristics.

Generally speaking, perfect noise filtering cannot be achieved without degrading the original signal. An aspect of the invention is that the problem of filtering the image sequence in the context of a certain video coding is considered as follows:

encode the noisy sequence using the optimal bit budget R, i.e. the number of bits used to encode a noise-free sequence;

given R, minimize the distortion due to filtering in that the coefficients of a given noise filter are adapted.

This can be regarded as a resource allocation problem where the optimal parameter set which allows efficient distribution of a given bit budget must be found in order to ensure satisfactory image quality. The invention, can be regarded as a general rate-distortion optimization framework to determine the optimal filter parameter set for a given video coder.

Figure 1:
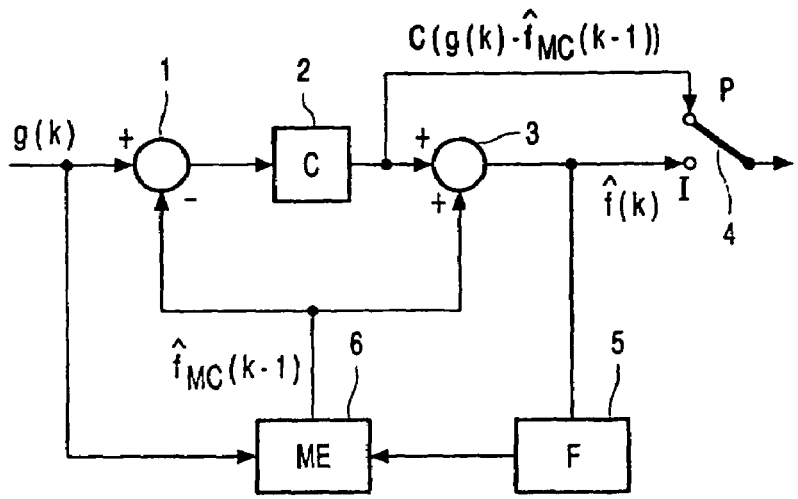
FIG. 1 shows the structure of an adaptive noise filter as known from the prior art (already discussed)
Figure 2:
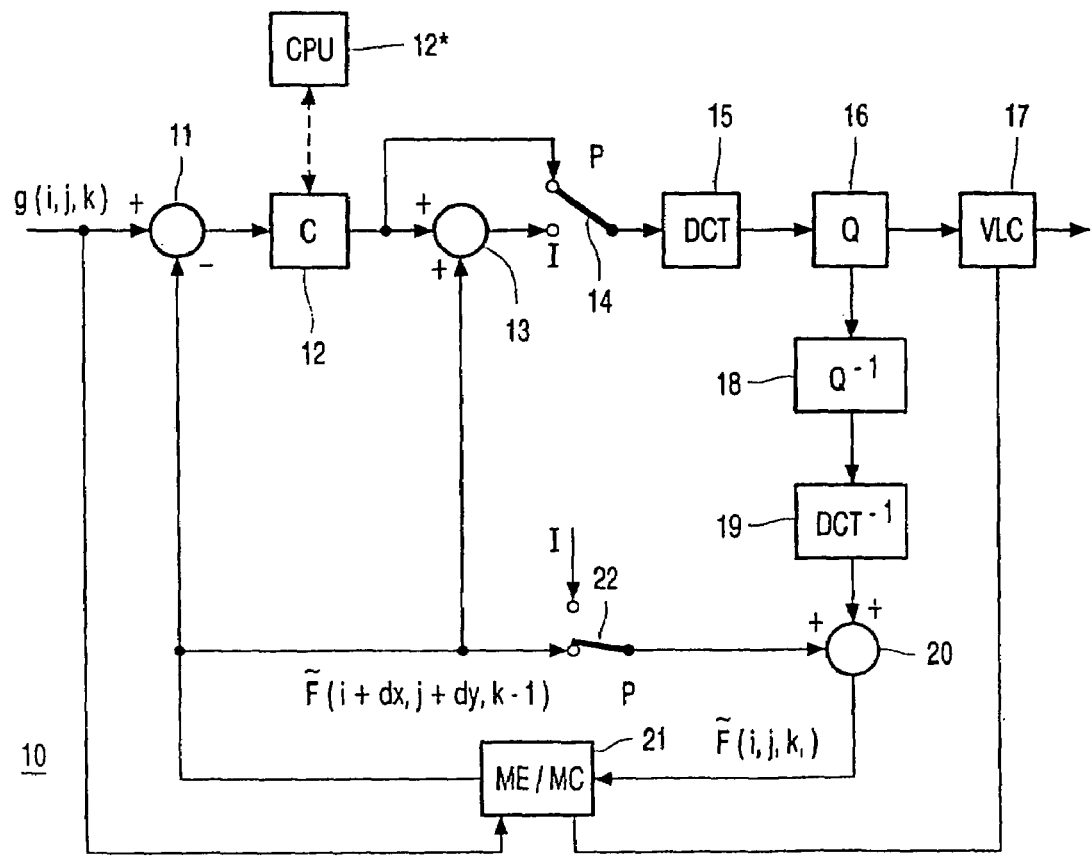
FIG. 2 shows a first embodiment according to the invention that provides combined video coding and noise reduction.

FIG. 2 shows a device 10 according to the invention that shows combined video coding and noise filtering. The device 10 comprises a subtractor 11, a noise filter 12 with a processing unit CPU 12*, an adder 13, a switch 14, a Discrete Cosine Transformer (DCT) 15, a Quantizer (Q) 16, a variable length coder (VLC) 17, an inverse quantizer ($Q^{-1}$) 18, an inverse DCT ($DCT^{-1}$) 19, an adder 20, a motion estimator (ME)/motion compensator (MC) 21 and a switch 22. The device 10 is a hybrid coder that codes the incoming image sequence g(i,j,k) spatially and temporally by DCT transformation plus quantization and motion compensation. The device produces intra-coded frames (I) and inter-coded frames (P). Inter-coded frames are motion-compensated while intra-coded frames are not. If the frame should be intra-coded, the switches 14 and 22 are positioned such that no motion-compensation is performed. All frames are DCT coded in the DCT 15, quantized in Q 16 and entropy coded in VLC 17. To obtain a reconstructed frame, that is necessary for motion estimation and motion compensation, the coded frame is inverse quantized in $Q^{-1}$ 18 and an inverse DCT transformed in $DCT^{-1}$ 19. A reconstructed frame is stored in a frame memory that is included in the ME/MC unit 21. The noise filter 12 filters a differential frame, because it is coupled to the subtractor 11. The device 10 and especially the noise filter 12 with the CPU 12* will be discussed in more detail below.

Assume an exemplary, simple additive noise model, given by:

$$g(i,j,k) = f(i,j,k) + n(i,j,k) \quad (1)$$

where $g(i,j,k)$ denotes the observed image sequence that is input to the subtractor 11, $f(i,j,k)$ the original sequence and $n(i,j,k)$ the noise; $i,j$ are the spatial coordinates and $k$ the discrete time variable (frame index). The noise $n(i,j,k)$ is assumed to be zero-mean, white, independent of $f(i,j,k)$ and Gaussian distributed with constant variance $\sigma_n^2$.

As an illustration and in order to keep the computation low, the following discussion is focussed on a simplified motion compensated (MC) noise filter [2] producing a filtered frame:

$$F(i,j,k) = F(i+v_{i,j}^x(k), j+v_{i,j}^y(k), k-1) + C_{i,j}(k)(g(i,j,k) - F(i+v_{i,j}^x(k), j+v_{i,j}^y(k), k-1)) \quad (2)$$

wherein $\vec{v}_{i,j}(k) = [v_{i,j}^x(k) v_{i,j}^y(k)]^T$ is the displacement of position $(i,j)$ and $C_{i,j}(k)$ is a control parameter to adapt a response of the noise filter 12.

For the given MC video coding system 10, consider now an image that is partitioned into $K_1 \times K_2$ fixed-sized block regions for motion estimation and motion compensation; the corresponding displacement set is $d_k = (\vec{d}_{0,0}(k), \ldots, \vec{d}_{K_1-1, K_2-1}(k))$. Besides, suppose that the image is partitioned into $N_1 \times N_2$ non-overlapping blocks of dimensions $I \times J$ for MC filtering. The corresponding control parameter set and displacement set are given by:

$$C_k = (C_{0,0}(k), \ldots, C_{N_1-1, N_2-1}(k)) \text{ en } v_k = (v_{0,0}(k), \ldots, v_{N_1-1, N_2-1}(k)) \text{ respectively.}$$

The control parameter set and the motion vectors are assumed to be both in a finite set of admissible values.

$$F_{n1,n2}(i,j,k) = F(i+v_{n1,n2}^x(k), j+v_{n1,n2}^k(k), k-1) + C_{n1,n2}(k)[g_{n1,n2}(i,j,k) - F(i+v_{n1,n2}^x(k), j+v_{n1,n2}^y(k), k-1)] \quad (3)$$

denotes the filtered frame to be encoded, and $$\tilde{F}_{k1,k2}(i,j,k) = \tilde{F}(i + d_{k1,k2}^x(k), j + d_{k1,k2}^y(k), k-1) + Q[F_{n1,n2}(i,j,k) - \tilde{F}(i + d_{k1,k2}^x(k), j + d_{k1,k2}^y(k), k-1)] \quad (4)$$

the reconstructed filtered frame as displayed at a decoder wherein $Q[.]$ is a quantization operator as present in quantizer 16. Note that k1 and k2 are indices to indicate a block region for motion estimation and motion compensation.

Two separate motion estimation/compensation processes have to be performed: one for the noise filtering and an other for the motion compensated coding. In order to save computational effort, it is assumed here that $F(i,j,k) = g(i,j,k)$ and that the sequence $g(i,j,k)$ being encoded is filtered along the motion trajectory $v_k = d_k[1]$. This means that the filtering is based on the motion compensated prediction performed in the coding loop. See FIG. 2.

The reconstructed filtered frame is then given by:

$$\tilde{F}_{k1,k2}(i,j,k) = \tilde{F}(i + d_{k1,k2}^x(k), j + d_{k1,k2}^y(k), k-1) + Q[C_{n1,n2}(k)(g_{n1,n2}(i,j,k) - \tilde{F}(i + d_{k1,k2}^x(k), j + d_{k1,k2}^y(k), k-1))] \quad (5)$$

Notice that, since motion estimation is performed from the noisy observation $g(i,j,k)$, the noise may result in inaccurate motion estimates, which degrade the motion-compensated prediction. Therefore, a noise-robust motion estimator (ME) 21 for the computation of $d_k$ is adopted in an advantageous embodiment. A low-complexity spatio-temporal recursive ME [3] can be used.

A rate-distortion optimization problem is formulated to compute the control parameter set $C_k$. Let $R_k^f$ be the number of bits used to encode a displaced frame difference (DFD) associated with the noise-free sequence $f(i,j,k)$, denoted as:

$$DFD(f,f) = Q(f_{k1,k2}(i,j,k) - \tilde{f}_{filtered}(i + d_{k1,k2}^x(k), j + d_{k1,k2}^y(k), k-1)) \quad (6)$$

The goal is to find the set $C_k$ which minimizes the frame distortion: $D^g(C_k) = \text{Function}(g(i,j,k), F(i,j,k))$ for the given bit rate constraint $R_k^f$.

Note that, since $f(i,j,k)$ is not available, only the distortion due to the filtering by means of $D^g(C_k)$ can be taken into account but it is not possible to consider the degradation due to noise.

Let $D_{n1,n2}^g(C_k)$ and $R_{n1,n2}^g(C_k)$ represent the distortion and the rate associated with the region $(n_1, n_2)$ respectively. Then the RD optimization problem can be expressed as:

$$\min_{C_k} D^g(C_k) = \min_{C_k} \sum_{n1,n2} D_{n1,n2}^g(C_k) \quad (7)$$

$$\text{subject to } R_k^g = \sum_{n1,n2} R_{n1,n2}^g(C_k) = R_k^f \quad (8)$$

Equations (5), (7) and (8) define the proposed RD optimized MC temporal noise filter for video coding.

In order to solve this problem efficiently, an unconstrained problem can be formulated by merging the rate term with the distortion term through a Lagrange multiplier $\lambda_k$ [4]. Introducing the total Lagrange cost function:

$$J(C_k, \lambda_k) = \sum_{n1,n2} \lfloor D_{n1,n2}^g(C_k) + \lambda_k R_{n1,n2}^g(C_k) \rfloor \quad (9)$$

It has been shown [5] that if there is a $\overline{\lambda}_k$ such that:

$$\overline{C}_k = \arg\left\{\min_{C_k} J(C_k, \overline{\lambda}_k)\right\} \quad (10)$$

leads to $\overline{R}_k^g = \sum_{n1,n2} R_{n1,n2}^g(\overline{C}_k) = R_k^f \quad (11)$ then $\overline{C}_k$ is also an optimal solution to (7), (8).

A bisection method can be used to find an optimal $\overline{\lambda}_k$. Supposing that the partition for noise filtering is such that there is no inter-region dependency, both rate and distortion of the region $(n_1,n_2)$ depend only on the single $C_{n_1,n_2}(k)$ associated with that region. Thus, we have $$R_{n_1,n_2}^g(C_k) = R_{n_1,n_2}^g(C_{n_1,n_2}(k)) \quad (12)$$

and $$D_{n_1,n_2}^g(C_k) = D_{n_1,n_2}^g(C_{n_1,n_2}(k)) \quad (13)$$

where the distortion is expressed as:

$$D_{n1,n2}^g(C_{n1,n2}(k)) = \frac{1}{IJ}\sum_{i=1}^{I}\sum_{j=1}^{J}\left(g_{n1,n2}(i,j,k) - \tilde{F}_{n1,n2}(i,j,k)\right)^2 \quad (14)$$

Therefore, the principle of separate minimization can be invoked, converting the joint optimization problem of (10) into a simpler optimization problem in which each control parameter $C_{n_1,n_2}(k) \in C_k$ can be determined independently, according to:

$$\overline{C}_{n1,n2}(k) = \arg\min_{C_{n1,n2}(k)} \lfloor D_{n1,n2}^g(C_{n1,n2}(k)) + \overline{\lambda}_k R_{n1,n2}^g(C_{n1,n2}(k)) \rfloor \quad (15)$$

Since in general there is no prior knowledge of the rate $R_k^f$ associated with the frame $f(i,j,k)$, it would not be possible to compute $\overline{\lambda}_k$ such that (11) is fulfilled. An efficient method is proposed that is base on a scheme as described in [6]. This scheme implicitly estimates the noise power from the input data without the need for additional a priori information. An estimate $\overline{\lambda}_k^*$ of the optimal $\overline{\lambda}_k$ is computed as:

$$\overline{\lambda}_k^* = \arg\max_{\lambda_k} \frac{d^2 R_k^g}{d(\lambda_k)^2} \quad (16)$$

and assumed is that $$R_k^g(\overline{\lambda}_k^*) = R_k^f \quad (17)$$

An explanation of this equation is as follows: starting from $\lambda_k = 0$ a decreasingly smaller bit budget is allocated to encode the image sequence corrupted with additive noise, thus reducing resources to encode noise and increasing the compressibility of a picture. At a certain $\lambda_k$ which results to be a knee-point, the exact amount of bits to encode the original sequence is allocated. After this value, the compression ratio increases slowly, which points out that fewer bits than necessary are allocated to encode video information.

Figure 3:
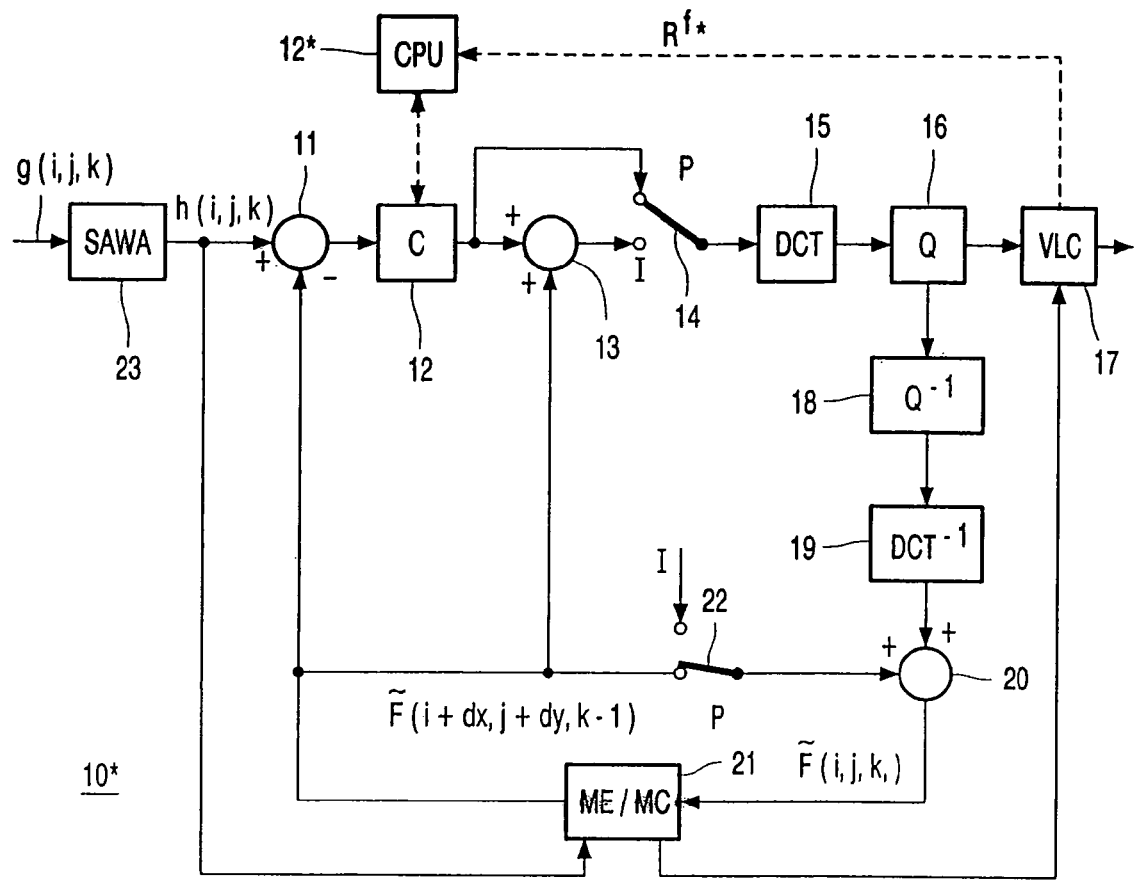
FIG. 3 shows a second embodiment according to the invention that provides combined video coding and noise reduction.

In a second embodiment 10* of the invention as shown in FIG. 3, a spatial adaptive weighted averaging (SAWA) filter 23 is used as an estimator of the rate term $R_k^f$. A detailed description of the SAWA filter can be found in [7]. The SAWA estimate $h(i,j,k)$ at the pixel location $(i,j)$ in the kth frame is defined as $$h(i,j,k) = \sum_{(m,n,l)\in S(i,j,k)} w(m,n,l) g(m,n,l) \quad (18)$$

$$\text{where } w(m,n,l) = \frac{K(i,j,k)}{1 + a\max\{\varepsilon^2, [g(i,j,k) - g(m,n,l)]^2\}} \quad (19)$$

are the weights within the spatial Support $S(i,j,k)$, defined as the 3×3 spatial window centered about the current pixel location. $K(i,j,k)$ is a normalization constant and $\alpha$ and $\epsilon$ are tuning parameters. The quantity $\alpha$, usually set at 1, controls how rapidly the weights should reduce as a function of the mismatch between pixels values, whereas the parameter $\epsilon^2$ determines the switching between weighted and direct averaging. In order to obtain accurate estimates of the number of bits to encode the DFD regardless of the noise level, a relationship between the parameter $\epsilon^2$ and the noise variance $\sigma_n^2$ may be determined experimentally. From a number of experiments has been achieved that $\epsilon^2 = (\delta\sigma_n^2)^2$, where $\delta$ is a tuning constant. The estimate $R_k^{f*}$ of the rate $R_k^f$ is then the number of bits used to encode:

$$DFD(h,\tilde{h}) = Q(h_{k1,k2}(i,j,k) - \tilde{h}\tilde{a}\tilde{t}\tilde{h}\tilde{m}\tilde{e}d(i + d_{k1,k2}^x(k), j + d_{k1,k2}^y(k), k-1)) \quad (20)$$

The number of bits $R_k^{f*}$ is determined in VLC 17 and furnished to the CPU 12* of the noise filter 12. The parameter set $\overline{C}_k$ can be computed for each frame, but also kept constant for a certain number of frames.

In general, three-dimensional filtering techniques may be employed to exploit both the spatial correlation between the pixels and the temporal correlation between the frames. Furthermore, in order to reduce the processing burden, the filtering procedure may be separated in a spatial part, which operates on each frame separately, and a temporal part operating in the direction of motion. This technique is more advantageous especially for low SNR's since the displacement vectors are now estimated from the current and the previous frame after they have been spatially filtered, which provides additional robustness to the motion estimates. According to this strategy, SAWA pre-filtering of the current frame $g(i,j,k)$ may be done first, and then the MC temporal filter may be applied to the smoothed images; i.e. $g(i,j,k)$ of equation (5) is replaced by $h(i,j,k)$ of equation (18), see FIG. 3. In order to achieve optimal distortion performance, $\epsilon^2 = 2\sigma_n^2$ is set for SAWA pre-filtering.

Figure 4:
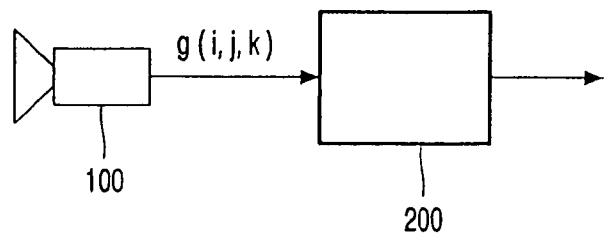
FIG. 4 shows a camera system according to the invention.

A video coder according to the invention can be used in many applications, such as broadcast, video-phone, video-conferencing systems, satellite observation, surveillance systems, etc. FIG. 4 shows a camera system according to the invention, comprising a camera 100 and a device 200. The camera furnishes the image sequence $g(i,j,k)$ to the device 200. The device 200 is similar to the device 10 or the device 10* as shown in FIGS. 2 and 3 respectively.

The invention is especially applicable on low bit-rate motion compensated hybrid coding schemes, such as H.261 and H.263, but also on MPEG.

In summary, the invention provides a method of and a device for coding an image sequence $g(i,j,k)$. The device has a noise filter for noise filtering the image sequence g(i,j,k), and means for regarding the noise filtering as a rate-distortion optimization problem in order to adapt the response of the noise filter. In particular, a filter parameter set C is determined to adapt the response of the filter in that the image sequence g(i,j,k) is encoded using an optimal bit-budget, which is the bit-budget used for compressing a noise-free image sequence, and the distortion for the given bit-budget is minimized.

A solution of the rate-distortion problem is proposed that calculates the filter parameter set C by a Lagrange multiplier method. Separate minimization is used to determine each parameter of the parameter set C independently. In a practical embodiment, spatial adaptive weighted averaging filtering is used to estimate the bit budget and to pre-filter the image sequence g(i,j,k).

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware.

REFERENCES

[1] R. P. Kleihorst, A. van der Werf, W. H. A. Bruls, W. F. J. Verhaegh, and E. Waterlander, "MPEG2 video encoding in consumer electronics", *J. VLSI Signal Processing Syst.*, Vol. 17, pp. 1–13, 1997.

[2] A. K. Katsaggelos, J. N. Driessen, S. N. Efstratiadis, and R. L. Lagendijk, "Spatio-temporal motion compensated noise filtering of image sequences", *Proc. SPIE Conf. Visual Commun. and Image Processing,* Vol. 1199, pp. 61–70, 1989.

[3] S. Olivieri, G. de Haan, and L. Albani, "Noise-robust recursive motion estimation for H.263 based videoconferencing systems", *Proc. MMSP'99*, 1999.

[4] K. Ramchandran, A. Ortega, M. Vetterli, "Bit allocation for dependent quantization with applications to multiresolution and MPEG video coders", IEEE Trans. Image Processing, Vol. 3, pp. 533–545, September 1994.

[5] Y. Shoham and A Gersho, "Efficient bit allocation for an arbitrary set of quantizers", *IEEE Trans. Acoust., Speech, Signal Processing*, Vol. 36, pp. 1445–1453, September 1988.

[6] B. K. Natarajan, "Filtering random noise from deterministic signals via data compression", IEEE Trans. Signal Processing, vol. 43, pp. 2595–2605, November 1995.

[7] M. K. Ozkan, M. I. Sezan, and A. M. Tekalp, "Adaptive motion-compensated filtering of noisy image sequences", *IEEE Trans. Circuits Syst. Video Technol.,* Vol. 3, pp. 277–290, August 1993.

The invention claimed is:

1. A method of coding (10, 10\*) an image sequence (g(i,j,k), the method comprising the steps of:
   noise filtering (12) the image sequence (g(i,j,k); and
   adapting (12\*) said noise filtering (12) in dependence on a number of bits to code a noise-free image sequence by calculating (12\*) a filter parameter set (C) of said noise filtering (12) by a Lagrange multiplier method.

2. A method as claimed in claim 1, wherein the adapting step (12\*) comprises the steps of:
   estimating (12\*) an optimal Lagrange multiplier by determining a maximum of a second derivative of a rate used in the adapting said noise filtering step.

3. A method as claimed in claim 1, wherein the adapting step comprises the steps of:
   spatial filtering (23) the image sequence; and
   taking (17) a number of bits that is used to encode the spatially filtered image sequence as a rate used in the adapting said noise filtering step.

4. A device (10, 10\*) for coding an image sequence (g(i,j,k), the device comprising:
   means (12) for noise filtering the image sequence (g(i,j,k), and
   means (12\*) for adapting a response of said means for noise filtering (12) in dependence on a number of bits to code a noise-free image sequence by calculating (12\*) a filter parameter set (C) of said noise filtering (12) by a Lagrange multiplier method.

5. A camera system comprising a camera (100) and a device (200) for coding an image sequence (g(i,j,k), the device comprising:
   means (12) for noise filtering the image sequence (g(i,j,k); and
   means (12\*) for adapting a response of said means for noise filtering (12) in dependence on a number of bits to code a noise-free image sequence by calculating (12\*) a filter parameter set (C) of said noise filtering (12) by a Lagrange multiplier method.

* * * * *